US011434615B2

(12) United States Patent
Lee

(10) Patent No.: US 11,434,615 B2
(45) Date of Patent: Sep. 6, 2022

(54) EASILY-EXPANDABLE WAVE-DISSIPATING BLOCK HAVING ARTIFICIAL FISH REEF FUNCTION

(71) Applicant: Jung Woo Lee, Busan (KR)

(72) Inventor: Jung Woo Lee, Busan (KR)

( * ) Notice: Subject to any disclaimer, the term of this patent is extended or adjusted under 35 U.S.C. 154(b) by 0 days.

(21) Appl. No.: 17/284,957

(22) PCT Filed: Oct. 29, 2019

(86) PCT No.: PCT/KR2019/014339
§ 371 (c)(1),
(2) Date: Apr. 13, 2021

(87) PCT Pub. No.: WO2020/091366
PCT Pub. Date: May 7, 2020

(65) Prior Publication Data
US 2021/0355643 A1  Nov. 18, 2021

(30) Foreign Application Priority Data

Oct. 30, 2018 (KR) .......................... 10-2018-0130801
Aug. 16, 2019 (KR) .......................... 10-2019-0100512
Aug. 16, 2019 (KR) .......................... 10-2019-0100513

(51) Int. Cl.
*E02B 3/04* (2006.01)
*E02B 3/06* (2006.01)
(Continued)

(52) U.S. Cl.
CPC ................ *E02B 3/06* (2013.01); *E02B 3/046* (2013.01); *E02B 3/12* (2013.01); *A01K 61/73* (2017.01)

(58) Field of Classification Search
CPC .......... A01K 6/73; A01K 61/77; E02B 3/046; E02B 3/06; E02B 3/12
See application file for complete search history.

(56) References Cited

U.S. PATENT DOCUMENTS 4,175,888 A * 11/1979 Ijima ........................ E02B 3/06
                                                                405/31
4,372,705 A    2/1983 Atkinson
(Continued)

FOREIGN PATENT DOCUMENTS

JP       2000-314120 A    11/2000
KR       20-0207856 Y1    12/2000
(Continued)

*Primary Examiner* — Benjamin F Fiorello
(74) *Attorney, Agent, or Firm* — Novick, Kim & Lee, PLLC; Jae Youn Kim

(57) ABSTRACT

Proposed is a wave-dissipating block including: a body placed on a seabed perpendicularly thereto and having a shape of a polygonal column, a cylinder, an oval column, or a cross-shaped column; male coupling protrusions formed on a first surface of the body in a height direction thereof and on a surface opposite to the first surface, respectively; female coupling grooves formed in a second surface of the body in the height direction thereof and in a surface opposite to the second surface, respectively; a habitat part configured as a space defined at a center portion of the body or a portion of the body; a dividing plate provided as a plate dividing the habitat part into habitat parts; a through hole formed in the dividing plate; and a space part having a space defined between multiple bodies of wave-dissipating blocks connected adjacently to each other.

16 Claims, 11 Drawing Sheets

(51) Int. Cl.
*E02B 3/12* (2006.01)
*A01K 61/73* (2017.01)

(56) References Cited

U.S. PATENT DOCUMENTS

| | | | | | |
|---|---|---|---|---|---|
| 4,503,649 | A | * | 3/1985 | Sciortino | E02B 3/06 405/16 |
| 4,594,023 | A | * | 6/1986 | O'Neill | E02B 3/06 405/29 |
| 5,429,451 | A | * | 7/1995 | Pettee, Jr. | E02B 3/14 404/41 |
| 5,890,836 | A | * | 4/1999 | Leech | E02B 3/14 405/16 |
| 5,921,710 | A | * | 7/1999 | Scales | E02B 3/14 405/20 |
| 6,079,902 | A | * | 6/2000 | Pettee, Jr. | E02B 3/14 404/35 |
| 6,186,702 | B1 | * | 2/2001 | Bartkowski | E02B 3/046 405/25 |
| 7,037,037 | B1 | * | 5/2006 | Smith | E02B 3/14 405/16 |
| 2016/0044899 | A1 | * | 2/2016 | Bartkowski | E02B 3/046 405/31 |
| 2016/0083924 | A1 | * | 3/2016 | Birnhack | E02D 27/52 405/224 |
| 2016/0122963 | A1 | * | 5/2016 | Ropert | E02B 3/129 405/29 |
| 2020/0149238 | A1 | * | 5/2020 | Birbeck | E02B 3/046 |

FOREIGN PATENT DOCUMENTS

| | | |
|---|---|---|
| KR | 10-2009-0032780 A | 4/2009 |
| KR | 10-2010-0108480 A | 10/2010 |
| KR | 10-1281910 B1 | 7/2013 |
| KR | 10-1501930 B1 | 3/2015 |
| KR | 10-2011672 B1 | 8/2019 |

* cited by examiner

EASILY-EXPANDABLE WAVE-DISSIPATING BLOCK HAVING ARTIFICIAL FISH REEF FUNCTION

TECHNICAL FIELD

The present disclosure relates generally to an easily-expandable wave-dissipating block having an artificial fish reef function. More particularly, the present disclosure relates to an easily-expandable wave-dissipating block having an artificial fish reef function which is configured to provide a function as an artificial fish reef by having space and a structure for fish and shellfish to inhabit, and to provide a function as a submerged breakwater or a breakwater by having space and a structure that perform the wave-dissipating function of attenuating the force of waves or of preventing the occurrence of reflected waves by absorbing energy of the waves.

BACKGROUND ART

A breakwater is built on a coast and in a harbor. The breakwater serves to attenuate the force of waves while the waves coming from an open sea hit the breakwater, and can minimize damage applied to ships or other facilities anchoring at an inland sea side by the waves.

Generally, a wave-dissipating block is a deformed concrete block designed to absorb the energy of waves, and is installed at a breakwater or seashore to which big waves come so as to attenuate the force of waves or to prevent the occurrence of reflected waves. As such a wave-dissipating block, a tetrapod, a hexagon block, a hollow triangular block, a hollow square, and an arch tribar, etc. are being used. The wave-dissipating block is required to satisfy wave-dissipating function and economical aspects, but a conventional wave-dissipating block has an unsatisfactory wave-dissipating performance compared to the size of the block, and is not easy to be transported or constructed.

A conventional breakwater is installed to have height such that the breakwater can block high waves, and blocks an inland sea from an open sea in a section in which the breakwater is installed. However, by constructing the breakwater in the form of confining seawater in this manner, the inflow and outflow of the seawater are not performed efficiently, so various kinds of pollutants accumulate in the inland sea, polluting the seawater and causing odor, which destroys the ecosystem of the inland sea.

Furthermore, a large repulsive force is generated in seawater hitting the breakwater, and subsequently incoming seawater and the seawater are combined with each other and hit the breakwater with greater energy. As a result, the height of wave gradually increases, and wave overtopping in which the wave rises over the breakwater occurs.

Meanwhile, generally, an artificial fish reef refers to an artificial structure installed in sea to provide a shelter, habitat, or spawning place for coastal migratory fish and for fish and shellfish living in a coastal sea.

Conventionally, such an artificial fish reef was manufactured to have a shape such as a sphere or a polyhedron using concrete or steel. Recently, the artificial fish reef is designed and manufactured to have a complex shape to achieve various purposes such as providing environment for attachment and habitation of seaweed spores, attachment and habitation of shellfish, and gathering and habitation of fish, and providing a good habitat environment for the fish and shellfish by supplying nutrient salts and oxygen by the formation of vortices.

That is, the existing artificial fish reef relies only on multiple frames to provide space for fish and shellfish to inhabit, so a structure of the existing artificial fish reef is complex and a manufacturing method thereof is difficult. Further, the existing artificial fish reef has an entire exterior having the shape of a polyhedron such as a tetrahedron or a hexahedron, and thus has a coupling structure difficult to be expanded or contracted in response to a submarine environment.

Accordingly, in an initial manufacturing stage, the artificial fish reef is designed to have a size corresponding to the submarine environment and is applied to a seabed, or a method of dropping multiple artificial fish reefs onto the seabed is being used.

Particularly, previously, a structure having functions as the artificial fish reef and the wave-dissipating block was not provided. The existing artificial fish reef or wave-dissipating block often failed to perform its function since the existing artificial fish reef or wave-dissipating block had differential settlement occurring in the process of the loss of sand on a seabed by waves, was covered by sand, or was moved by waves. Furthermore, The existing artificial fish reef or wave-dissipating block was not designed as a structure of effectively performing functions as a submerged breakwater and the breakwater that performs the wave-dissipating function of attenuating wave force or preventing the occurrence of reflective waves by absorbing energy of waves, and was not designed as a structure preventing a wave overtopping phenomenon that waves rise over the breakwater, so the existing wave-dissipating block having an artificial fish reef function had a structural problem in being used as the submerged breakwater or the breakwater.

Recently, due to sea level rise or frequent typhoons caused by global warming, accidents caused by wave overtopping occur every year, so efforts are being made to prevent the wave overtopping. Currently, the wave overtopping is prevented simply by increasing the height of the breakwater, so the construction cost of the breakwater is increased.

Accordingly, the present applicant has completed an easily-expandable wave-dissipating block having a new concept according to the present disclosure by conducting many studies in order to solve the various problems as described above.

DISCLOSURE

Technical Problem

The present disclosure has been made to solve the above problems and is intended to provide an easily-expandable wave-dissipating block having an artificial fish reef function which has a function as an artificial reef providing optimal space for fish and shellfish to inhabit by being easily expanded in directions perpendicular and parallel to a seabed, has a function as a submerged breakwater or a breakwater that performs the wave-dissipating function of attenuating the force of waves or of preventing the occurrence of reflected waves by absorbing energy of the waves, and has a function of increasing the life of the submerged breakwater or the breakwater and of preventing accidents beforehand which may be caused by wave overtopping.

Technical Solution

The present disclosure relates to an easily-expandable wave-dissipating block having an artificial fish reef function which is vertically and horizontally expanded on a seabed.

Here, a body of the wave-dissipating block is vertically placed on a seabed. Accordingly, a direction perpendicular to a seabed refers to a height direction (a longitudinal direction) of the body, and a direction parallel to the seabed refers to the horizontal and vertical directions of the body.

The easily-expandable wave-dissipating block includes: the body placed in the direction perpendicular to the seabed and configured to have the shape of a polygonal column, a cylinder, or an oval column (an embodiment a), the shape of a cylinder or an oval column (an embodiment b), or the shape of a cross-shaped column (an embodiment c); male coupling protrusions formed on a first surface of the body in the height direction thereof (the direction perpendicular to the seabed) and on a surface opposite to the first surface, respectively; female coupling grooves formed in a second surface of the body in the height direction thereof and in a surface opposite to the second surface, respectively, each of the female coupling grooves having a shape corresponding to a shape of each of the male coupling protrusions; a habitat part configured as space defined at a center portion of the body (the embodiment a and the embodiment b), or provided at a portion of the body in the height direction thereof (the embodiment c) so as to allow seawater to pass therethrough and remain therein such that the habitat part has a fish and shellfish habitat function and a wave-dissipating function; an auxiliary habitat part (the embodiment c) configured as space defined at the upper and lower surfaces of the body so as to allow the seawater to pass therethrough and remain therein such that the auxiliary habitat part has the fish and shellfish habitat function and wave-dissipating function; a cross-shaped vertical dividing plate (the embodiment a) or a middle dividing plate (the embodiment b) provided as a plate dividing the habitat part into habitat parts, the cross-shaped vertical dividing plate or the middle dividing plate supplying structural stability and a fish and shellfish habitat environment to the body; a through hole formed in the cross-shaped vertical dividing plate (the embodiment a) or the middle dividing plate (the embodiment b) by connecting the habitat parts to each other such that such that the habitat parts communicate with each other such that the fish and shellfish move and seawater flows; and a space part having a space defined between multiple bodies of wave-dissipating blocks connected adjacently to each other so as to allow the seawater to pass therethrough or remain therein such that the space part has the fish and shellfish habitat function and wave-dissipating function, wherein multiple insertion protrusions may be formed on an outer surface of the body, and an insertion groove may be formed between the multiple insertion protrusions. The easily-expandable wave-dissipating block having an artificial fish reef function may be expanded in the direction perpendicular to the seabed (in the height direction of the body) and in the direction parallel to the seabed (in the horizontal and vertical directions of the body) by inserting the male coupling protrusion to the female coupling groove.

In addition, groove parts may be formed at the circumferential parts of the upper and lower surfaces of the body; a groove part may be formed even in the male coupling protrusion; a groove part may be formed even in the female coupling groove, whereby the habitat parts of the wave-dissipating blocks adjacent to each other and the space parts defined between multiple wave-dissipating blocks connected adjacently to each other may communicate with each other such that fish and shellfish move and seawater flows therethrough.

Groove parts may be formed at the circumferential parts of the upper and lower surfaces of the body in which the male coupling protrusion and the female coupling groove are not formed, so in two wave-dissipating blocks expanded in the height direction of the body, a lower groove part of an upper wave-dissipating block and an upper groove part of a lower wave-dissipating block may cooperate with each other to form one hole part.

In addition, the male coupling protrusion may be inserted to the female coupling groove such that the wave-dissipating blocks are expanded in the directions perpendicular and parallel to the seabed, wherein the male coupling protrusion may be inserted to and removed from the female coupling groove only in the height direction of the body, but may be configured such that the male coupling protrusion is not inserted to and removed from the female coupling groove in the horizontal and vertical directions of the body.

Furthermore, in the case of a basic type of the wave-dissipating block, one male coupling protrusion or one female coupling groove may be formed on each surface of the body. However, in consideration of coupling force and structural stability between the bodies and in consideration of coupling force and structural stability between the wave-dissipating blocks expanded in the direction parallel to the seabed, at least two male coupling protrusions or at least two female coupling grooves may be formed on each surface of the body.

That is, in the case of the basic type, the male coupling protrusions may be formed on the first surface of the body in the height direction thereof and on a surface opposite to the first surface, respectively, so two male coupling protrusions may be formed on each body. However, in consideration of the coupling force and structural stability between each body, two to ten male coupling protrusions may be formed on each body.

Likewise, the number of the female coupling grooves may be required to correspond to the number of the male coupling protrusions. In the case of the basic type, the female coupling grooves may be formed in the second surface of the body and in the surface opposite to the second surface, respectively, so two female coupling grooves may be formed in each body. However, in consideration of the coupling force and structural stability, two to ten female coupling grooves may be formed in each body.

In addition, in the multiple wave-dissipating blocks expanded in the directions perpendicular or parallel to the seabed, the wave-dissipating blocks arranged adjacently to each other may be configured to have heights different from each other. In this case, in consideration of coupling force and supporting force between the wave-dissipating blocks adjacent to each other, when height of a basic wave-dissipating block is 1, a wave-dissipating block adjacent thereto may be configured to have height of 0.5, 1.5, 2, 2.5, 3, 3.5, or 4 which is a multiple of 0.5 except for 1, and preferably, may be configured to have height of one of 0.5, 1.5, 2, 2.5, and 3, and more preferably, may be configured to have height of one of 0.5, 1.5, and 2, and the most preferably, may be configured to have height of one of 0.5 and 1.5.

Furthermore, the multiple insertion protrusions may be formed on the outer surface of the body or on the inner surface of the body in which the habitat part is divided, and the insertion groove may be formed between the multiple insertion protrusions. The insertion groove may be configured to have a shape tapered from the outer surface of the body toward an inner part thereof so as to provide a niche space into which fish and shellfish are introduced to inhabit.

Additionally, to use the wave-dissipating blocks as a breakwater, upper surfaces of the wave-dissipating blocks may be required to be completed to be filled without a gap such that people, animals, and vehicles can pass efficiently thereon without falling. When the wave-dissipating blocks expanded in the direction parallel to the seabed are coupled to each other, coupling force between the wave-dissipating blocks expanded in the direction parallel to the seabed may be increased and thus structural stability therebetween may be increased. Accordingly, cover wave-dissipating blocks having various heights may be provided such that the upper or lower surfaces of the wave-dissipating blocks are completed without a gap and coupled to each other.

In this case, the body of each of the cover wave-dissipating blocks may be configured to correspond to each of the wave-dissipating blocks such that the body of the cover wave-dissipating block is coupled to the wave-dissipating block. The upper or lower surface of the wave-dissipating block may be configured to have a plate shape such that the upper or lower surface of the wave-dissipating block is filled without a gap.

Meanwhile, to use the wave-dissipating blocks as a breakwater, a side surface of each of the wave-dissipating blocks at an inland sea side may be required to be evenly completed to facilitate docking of a ship, so the wave-dissipating block for docking in which the male coupling protrusion and the female coupling groove are not formed in the side surface of the wave-dissipating block may be provided.

Advantageous Effects

According to the easily-expandable wave-dissipating block having an artificial fish reef function according to the embodiments of the present disclosure, multiple wave-dissipating blocks expanded in directions parallel and perpendicular to a seabed are configured to be connected to each other such that the wave-dissipating blocks are communicated with each other by multiple groove parts, habitat parts, through holes, and space parts so as to allow seawater to pass therethrough and remain therein, thereby creating an optimal environment for fish and shellfish to move efficiently and inhabit, and creating fisheries rich in plankton, food for fish and shellfish by enriching nutrient salts and oxygen due to the occurrence of the upwelling phenomenon and vortices in the wave-dissipating blocks.

In addition, according to the easily-expandable wave-dissipating block having an artificial fish reef function according to the embodiments of the present disclosure, multiple wave-dissipating blocks are configured to be connected to each other such that the wave-dissipating blocks are communicated with each other by the groove parts, the habitat parts, and the space parts, whereby seawater is introduced to and pass through or remain in the multiple wave-dissipating blocks expanded in directions parallel and perpendicular to a seabed, and the groove parts and the habitat parts formed in the multiple wave-dissipating blocks and a space part formed between wave-dissipating blocks neighboring to each other can absorb the energy of waves to have a wave-dissipating function.

Furthermore, according to the easily-expandable wave-dissipating block having an artificial fish reef function according to the embodiments of the present disclosure, multiple wave-dissipating blocks having the same shapes and different heights are configured to be laminated to have multiple layers and to be organically coupled to each other, whereby the wave-dissipating blocks can be prevented from being moved by the force of waves, and when portions of the wave-dissipating blocks expanded in directions perpendicular and parallel to a seabed are damaged, only the wave-dissipating blocks having the damaged portions can be exchanged, thereby enabling economical repair thereof.

Additionally, the easily-expandable wave-dissipating block having an artificial fish reef function according to the embodiments of the present disclosure is installed by being expanded in directions perpendicular and parallel to a seabed, thereby having a function as a submerged breakwater or a breakwater performing the wave-dissipating function of attenuating the force of waves or of preventing the occurrence of reflected waves by absorbing the energy of waves moving toward land, and reducing accidents due to wave overtopping.

In addition, according to the easily-expandable wave-dissipating block having an artificial fish reef function according to the embodiments of the present disclosure, multiple wave-dissipating blocks having the same shapes and different heights are configured to be laminated to have multiple layers and to be organically coupled to each other, thereby preventing the wave-dissipating blocks from being moved by the force of waves.

DESCRIPTION OF THE REFERENCE NUMERALS IN THE DRAWINGS

Figure 1A:
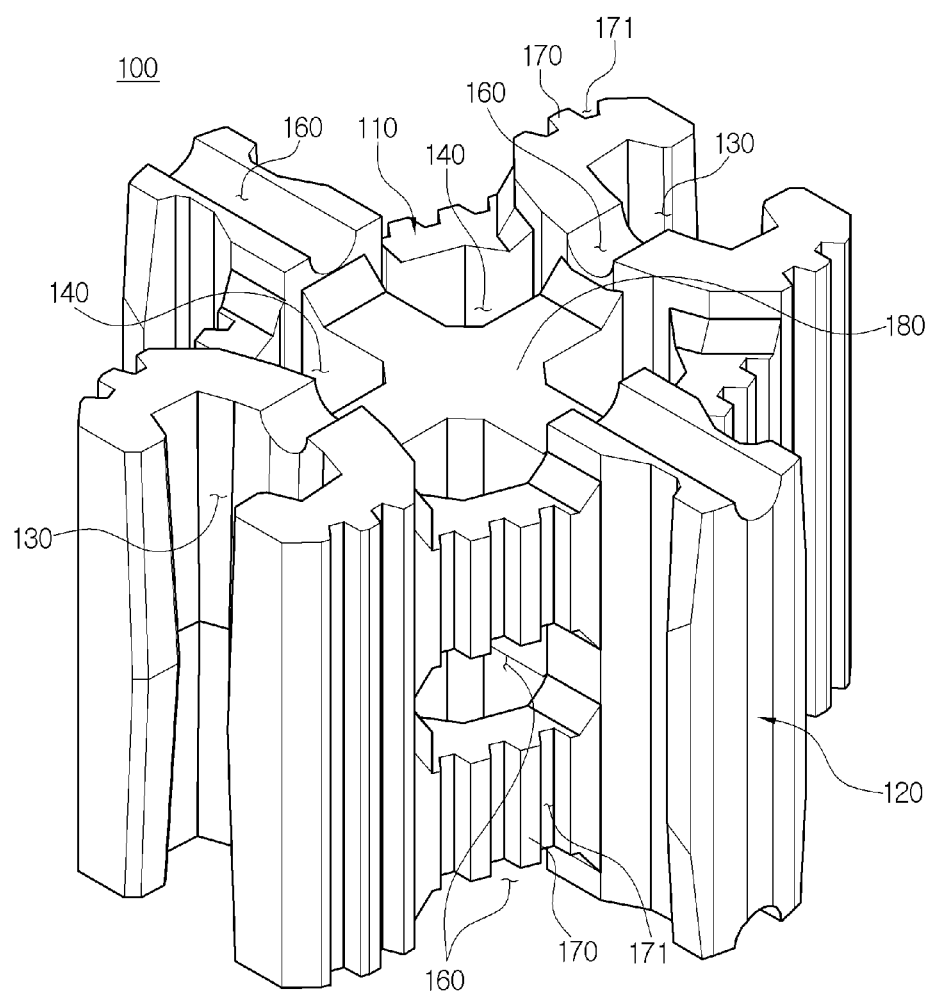
FIGS. 1a, 1b, and 1c are perspective views of easily-expandable wave-dissipating blocks having artificial fish reef functions according to embodiments a to c of the present disclosure (FIG. 1a in case of the embodiment a, FIG. 1b in case of the embodiment b, and FIG. 1c in case of the embodiment c).

100: Wave-dissipating block
110: Body
120: Male coupling protrusion
130: Female coupling groove
140: Habitat part
141: Auxiliary habitat part
150: Space part
160: Groove part
170: Insertion protrusion
171: Insertion groove
180: Cross-shaped vertical dividing plate
181: Middle dividing plate
190: Through hole

BEST MODE

Advantages and features of the present disclosure, and a method of achieving the advantages and features will become apparent with reference to embodiments described later in detail with the accompanying drawings.

However, the present disclosure is not limited to the embodiments disclosed below, but may be implemented in various forms. The embodiments are provided to make the present disclosure complete, and to fully inform the scope of the present disclosure to those skilled in the art to which the present disclosure belongs, and the present disclosure is defined only by the scope of the claims.

Hereinbelow, an easily-expandable wave-dissipating block having an artificial fish reef function according to the embodiments of the present disclosure will be described in detail with reference to FIGS. 1a, 1b, and 1c to FIGS. 4a, 4b, and 4c, more particularly, with reference to FIGS. 1a, 2a, 3a, and 4a in case of an embodiment a, FIGS. 1b, 2b, 3b, and 4b, in case of an embodiment b, and FIGS. 1c, 2c, 3c, and 4c in case of an embodiment c. In describing the easily-expandable wave-dissipating block of the present disclosure, detailed descriptions of related known functions or configurations are omitted so as not to obscure the subject matter of the present disclosure.

Figure 1B:
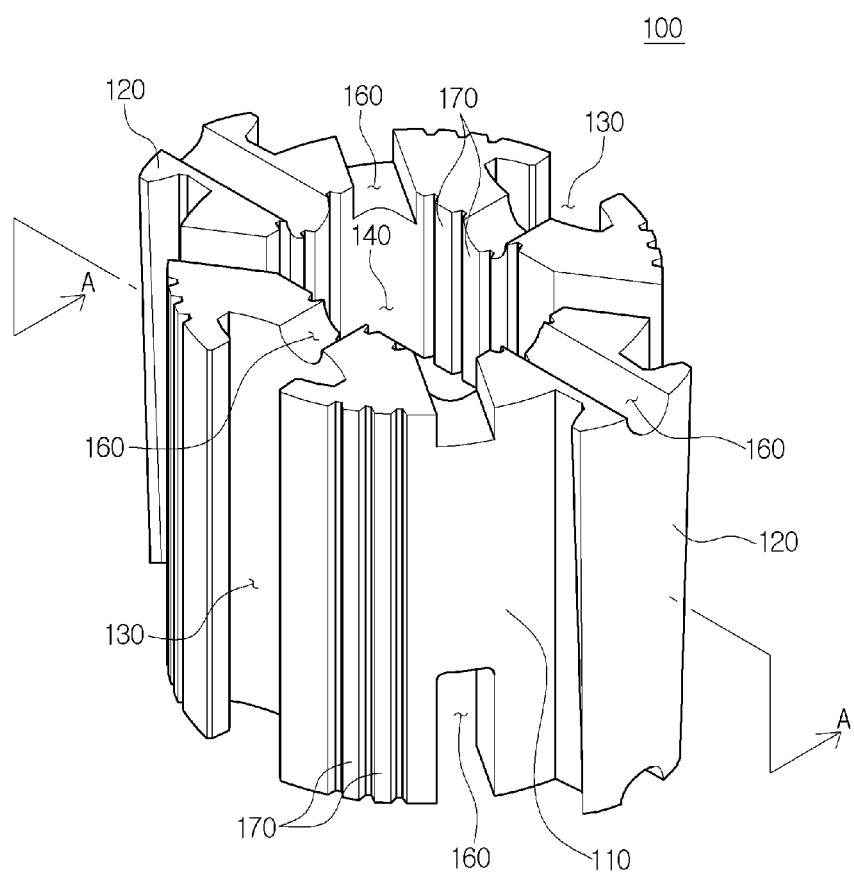
Figure 1C:
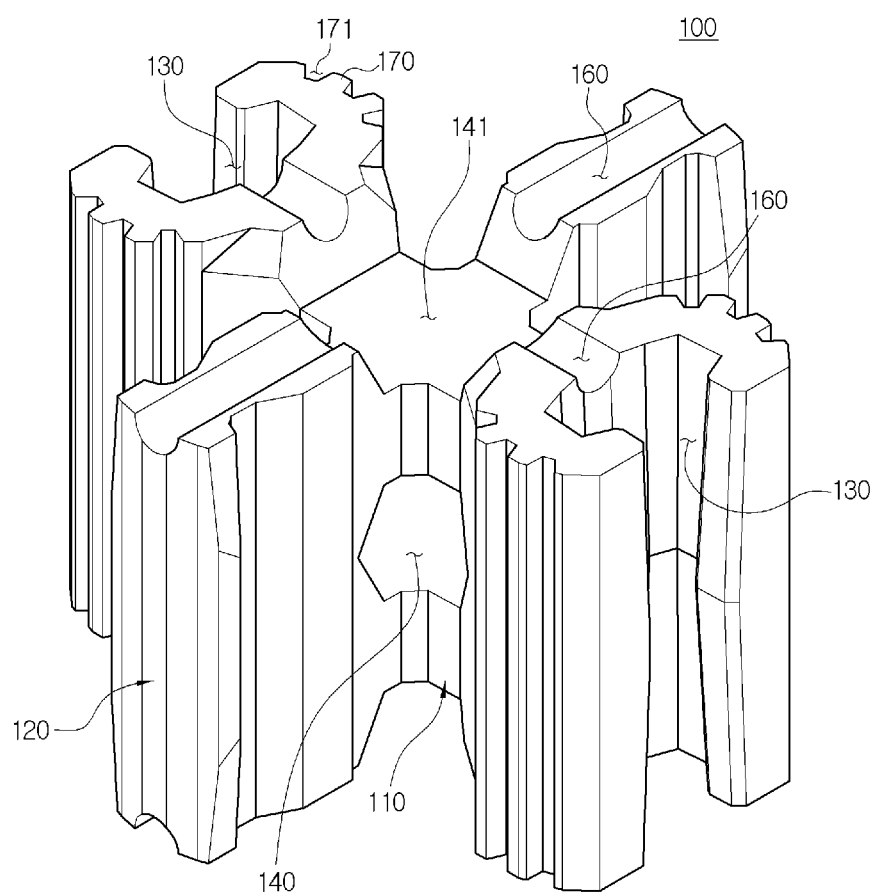
Figure 2A:
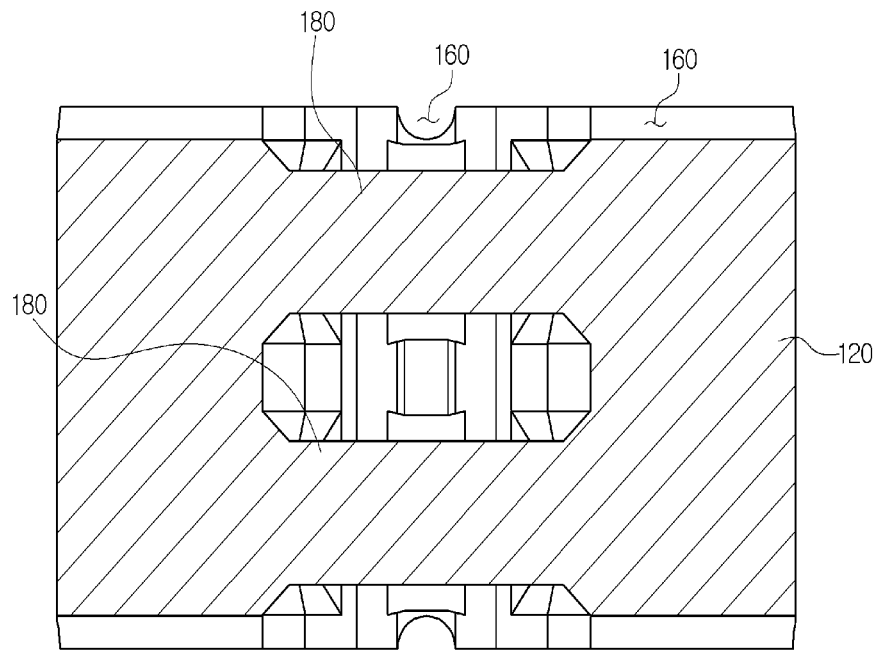
FIGS. 2a, 2b, and 2c are sectional views of the wave-dissipating blocks illustrated in FIGS. 1a, 1b, and 1c and seen in a direction of an arrow A-A of FIG. 1b (FIG. 2a in case of the embodiment a, FIG. 2b in case of the embodiment b, and FIG. 2c in case of the embodiment c).
Figure 2B:
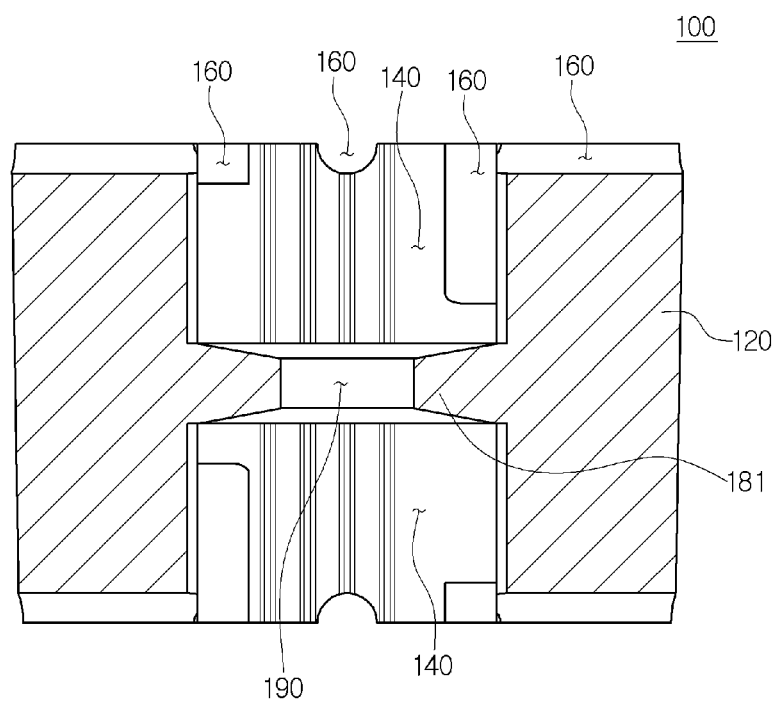
Figure 2C:
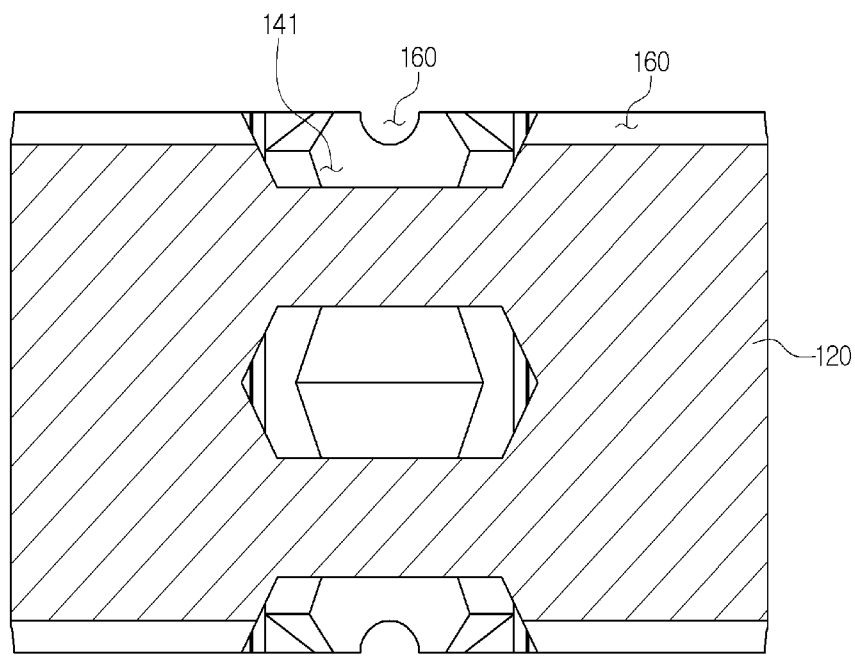
Figure 3A:
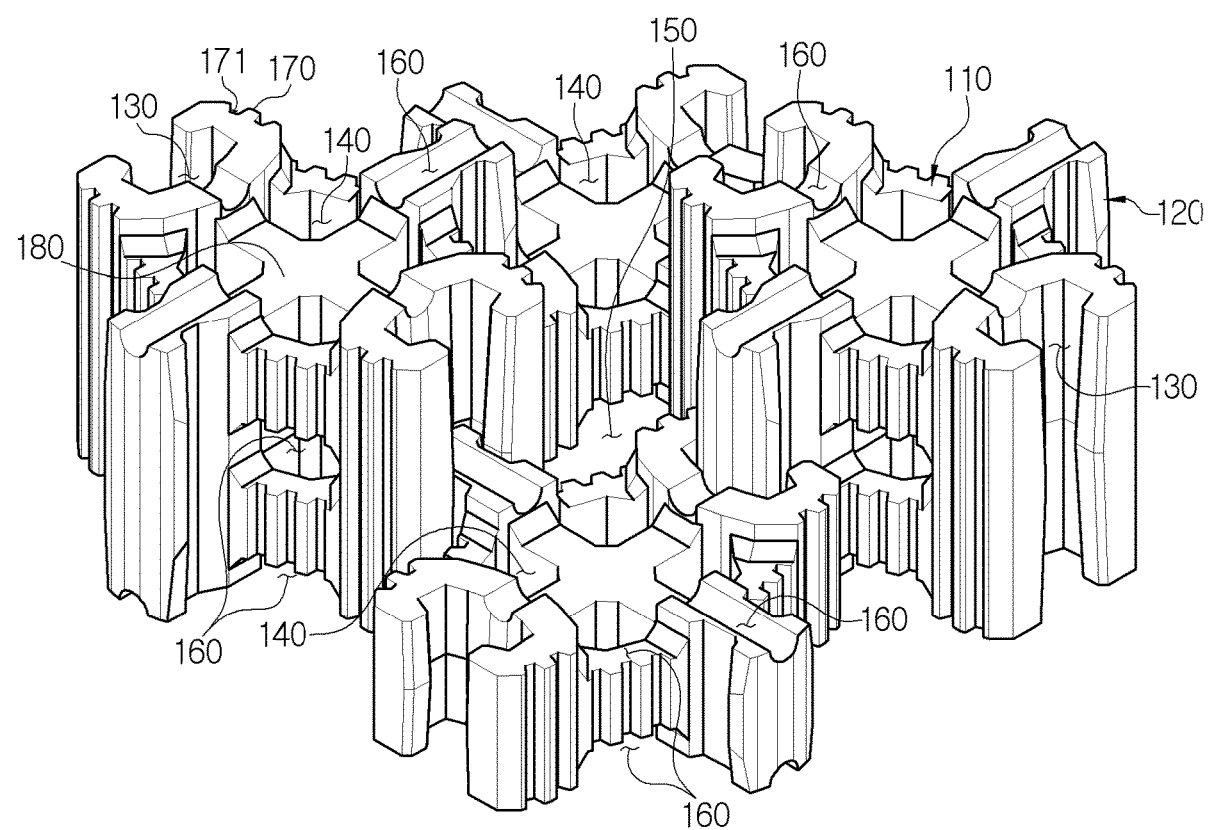
FIGS. 3a, 3b, and 3c are perspective views illustrating the wave-dissipating blocks which are expanded in a direction parallel to a seabed according to the embodiments a to c of the present disclosure (FIG. 3a in case of the embodiment a, FIG. 3b in case of the embodiment b, and FIG. 3c in case of the embodiment c).
Figure 3B:
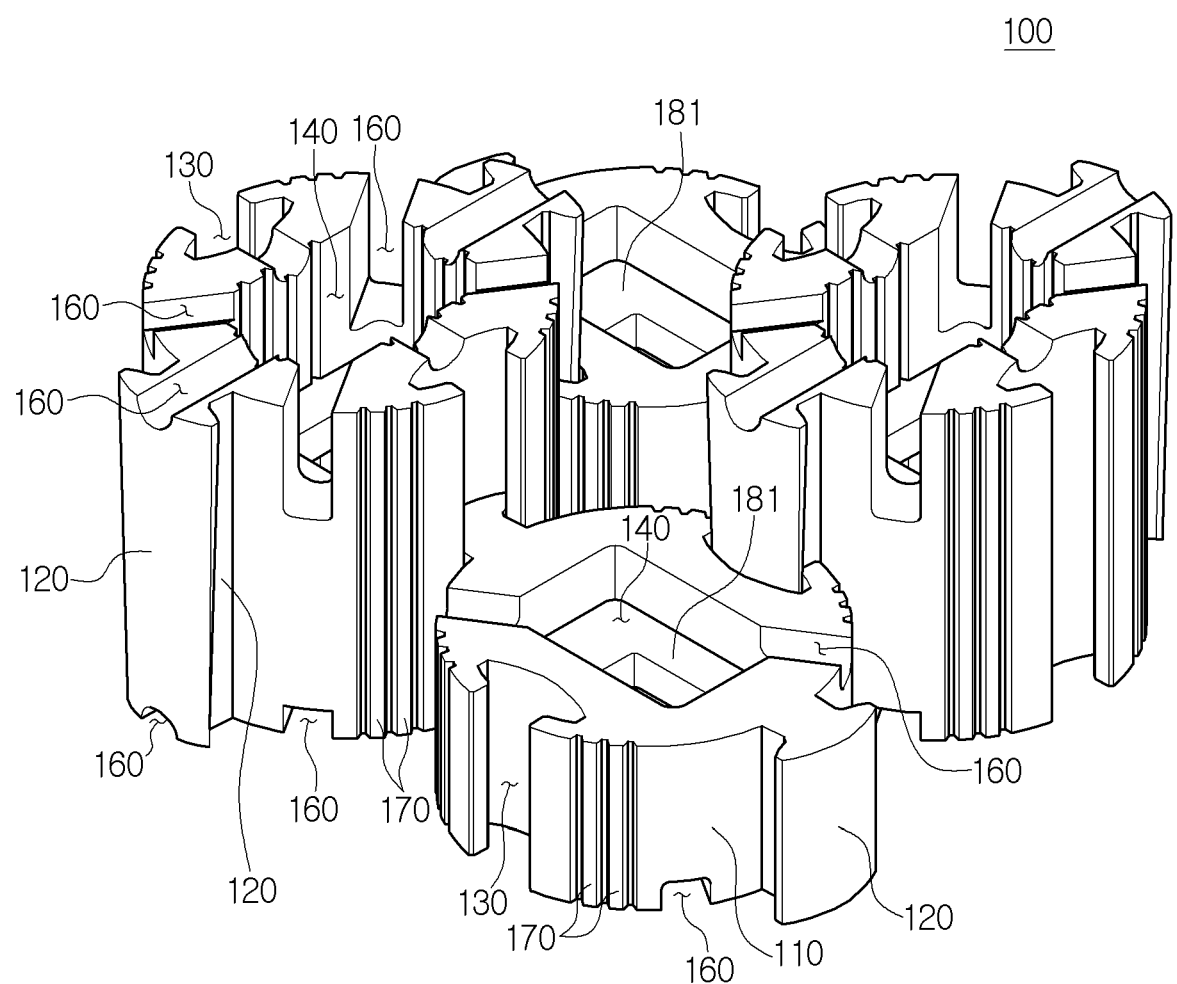
Figure 3C:
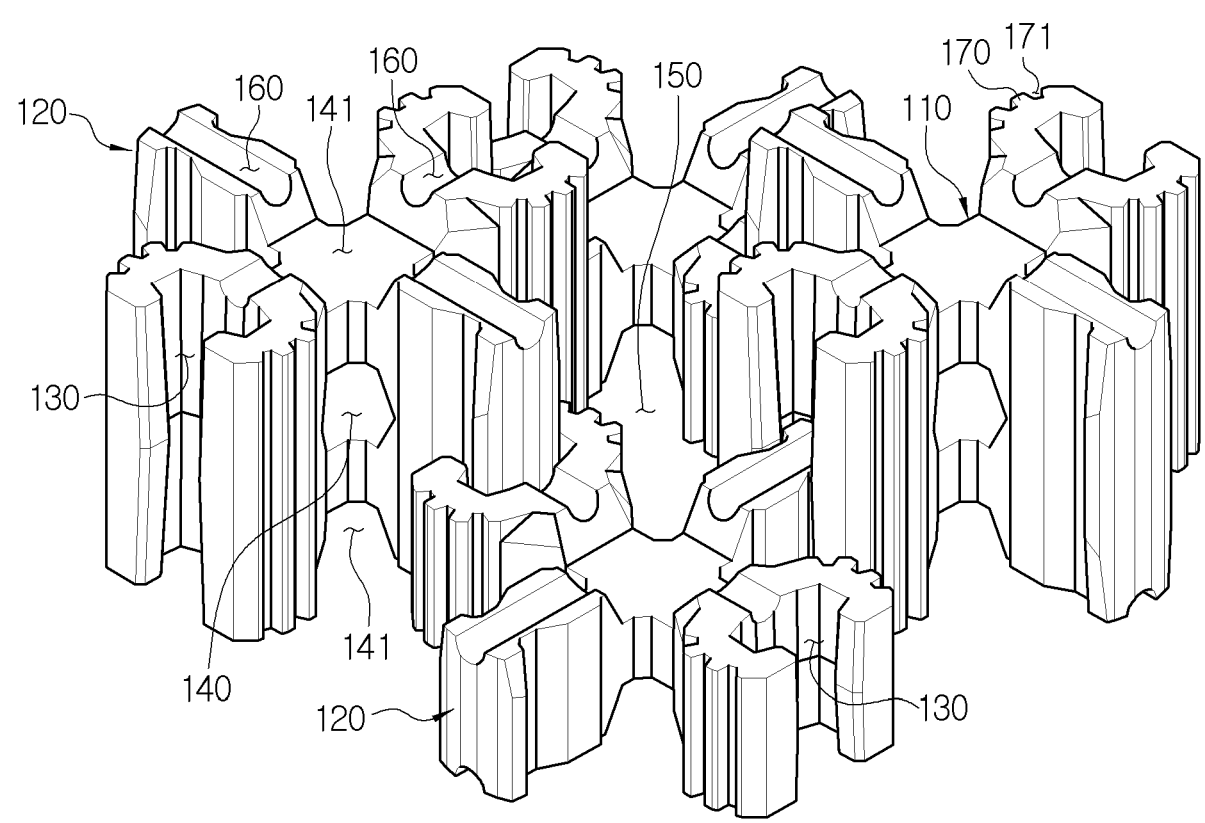
Figure 4A:
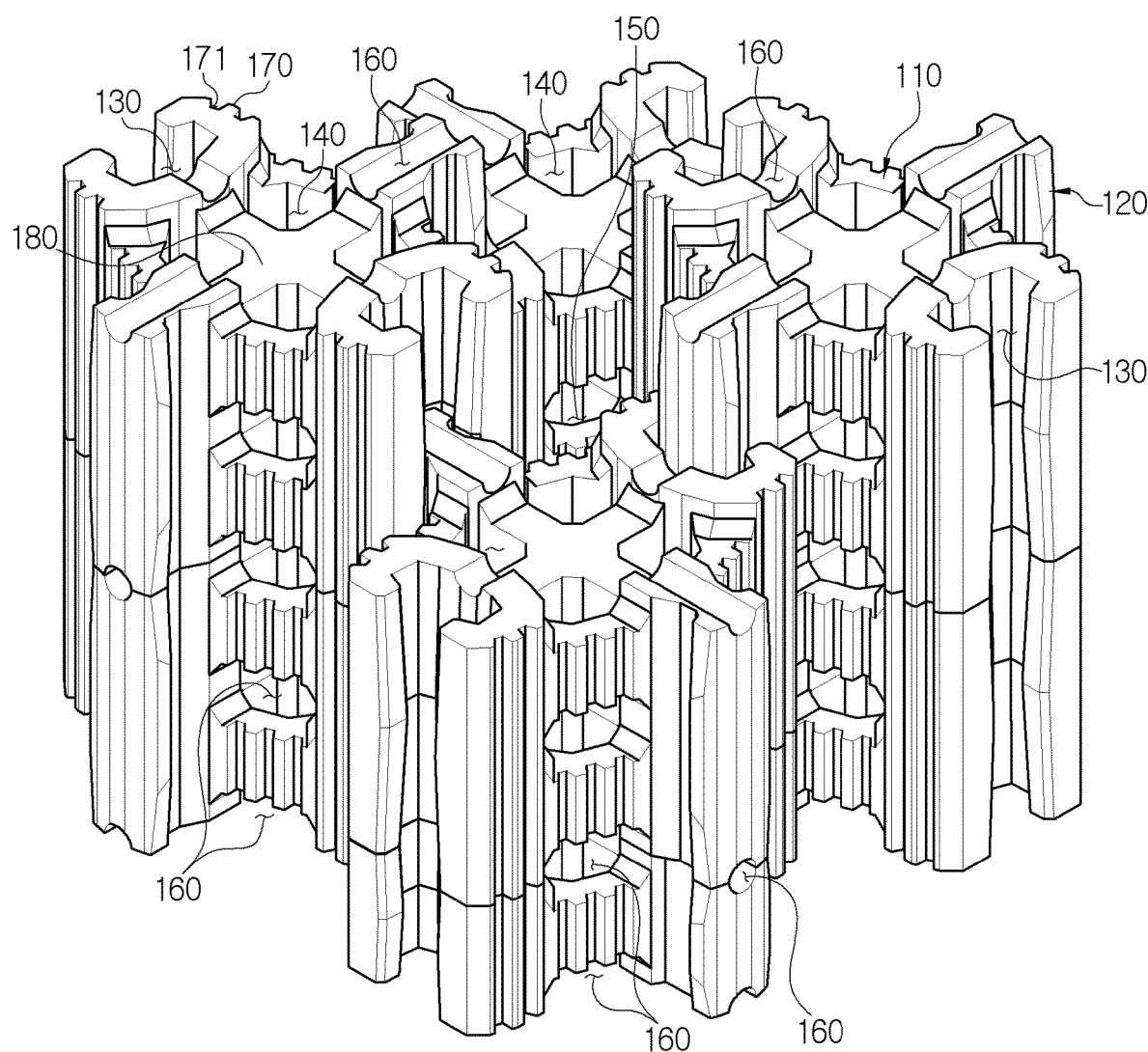
FIGS. 4a, 4b, and 4c are perspective views illustrating the wave-dissipating blocks which are expanded in the direction parallel to the seabed as illustrated in FIGS. 3a, 3b, and 3c and are further expanded in a direction perpendicular thereto according to the embodiments a to c of the present disclosure (FIG. 4a in case of the embodiment a, FIG. 4b in case of the embodiment b, and FIG. 4c in case of the embodiment c).
Figure 4B:
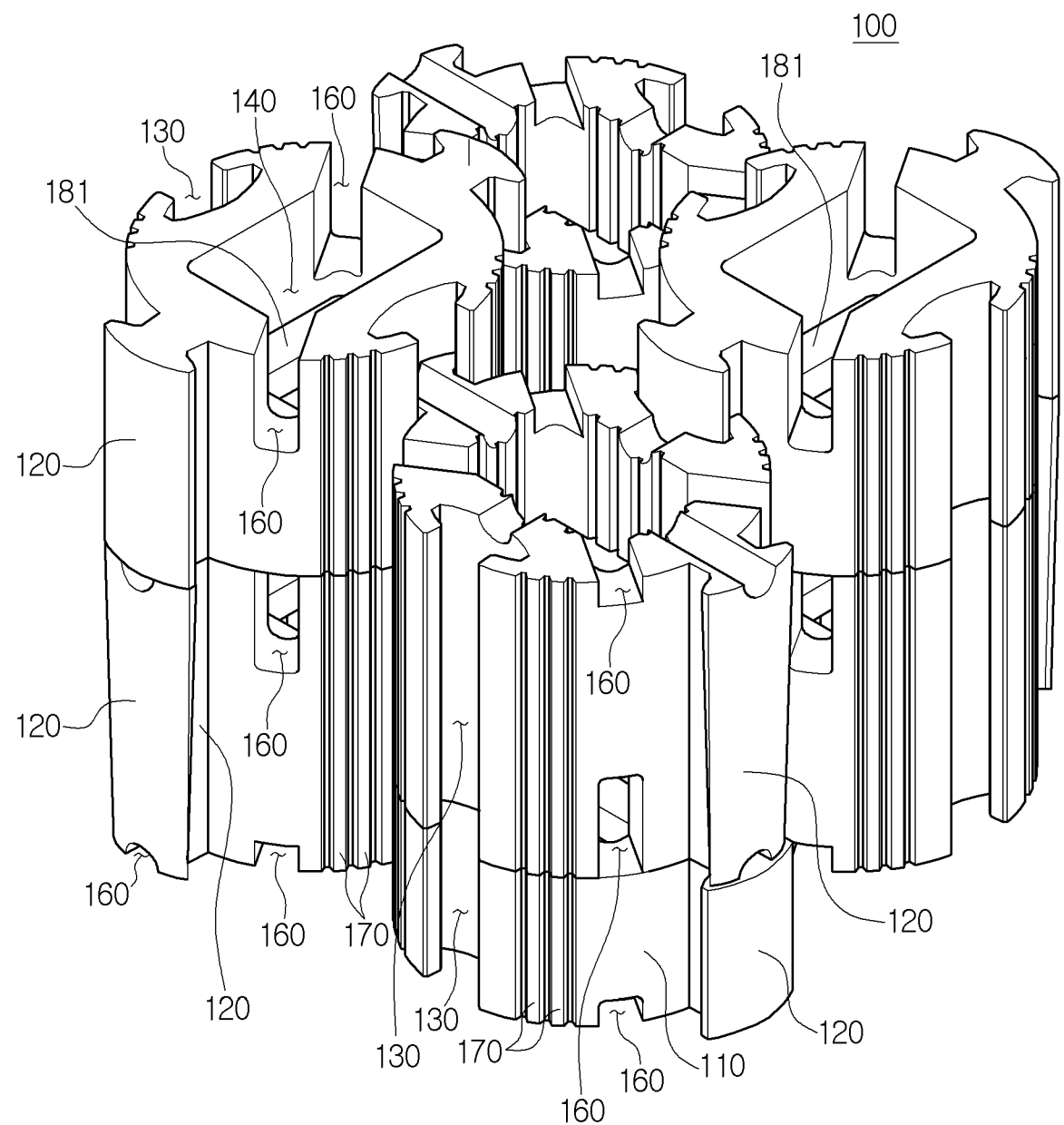
Figure 4C:
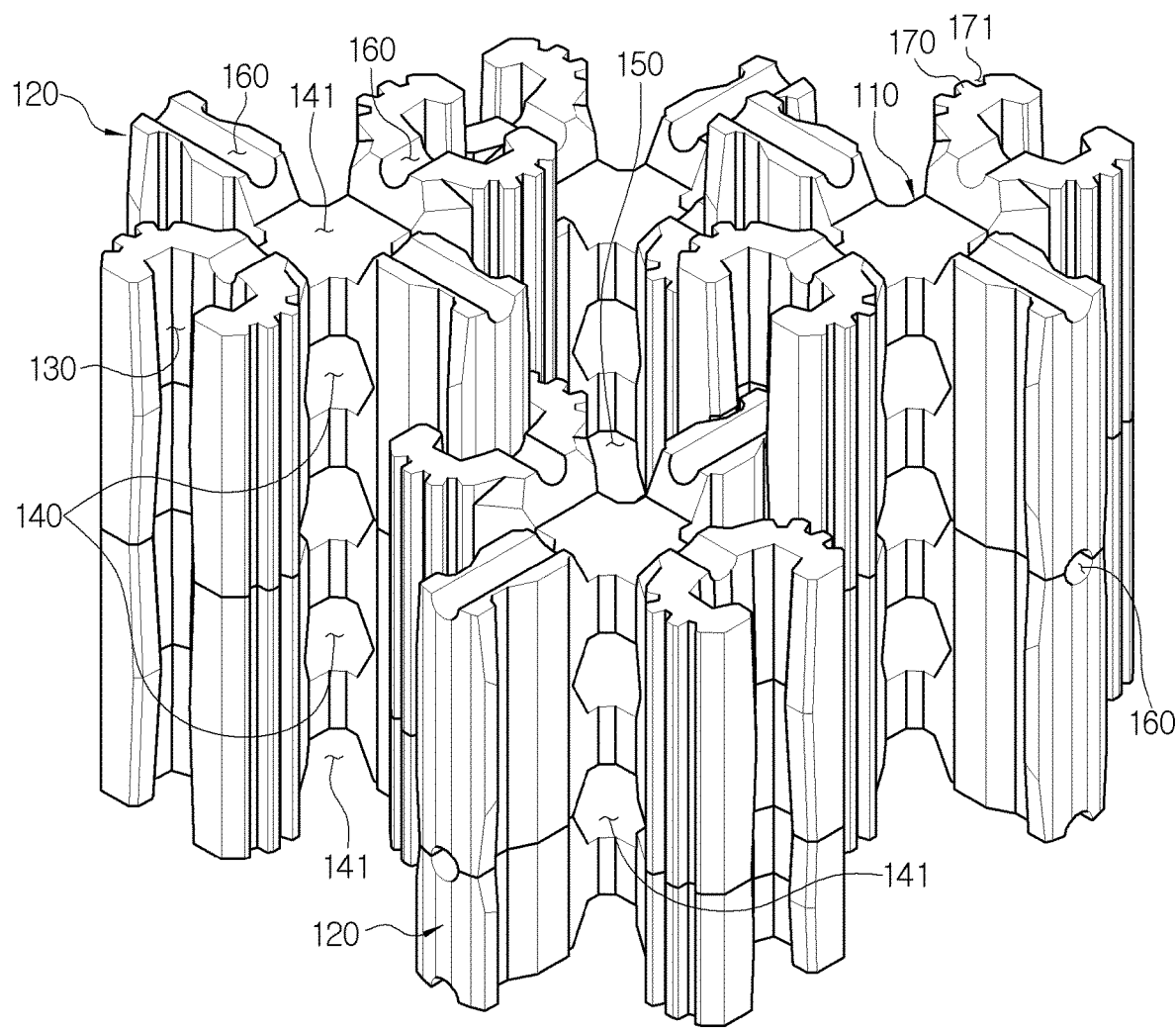

FIGS. 1a, 1b, and 1c are perspective views of the easily-expandable wave-dissipating blocks having artificial fish reef functions according to the embodiments of the present disclosure; FIGS. 2a, 2b, and 2c are sectional views of the wave-dissipating blocks illustrated in FIGS. 1a, 1b, and 1c and seen in a direction of an arrow A-A of FIG. 1b; FIGS. 3a, 3b, and 3c are perspective views illustrating the wave-dissipating blocks which are expanded in a direction parallel to a seabed according to the embodiments of the present disclosure; and FIGS. 4a, 4b, and 4c are perspective views illustrating the wave-dissipating blocks which are expanded in the direction parallel to the seabed as illustrated in FIGS. 3a, 3b, and 3c and then are further expanded in a direction perpendicular thereto according to the embodiments of the present disclosure.

As illustrated in FIGS. 1a, 1b, and 1c to FIGS. 4a, 4b, and 4c, the easily-expandable wave-dissipating block 100 having an artificial fish reef function according to the embodiments of the present disclosure may include: a body 110 placed in a direction perpendicular to a seabed and having one shape of the shape of a polygonal column, a cylinder, or an oval column (the embodiment a; FIGS. 1a, 2a, 3a, and 4a), the shape of a cylinder or an oval column (the embodiment b; FIGS. 1b, 2b, 3b, and 4b), and the shape of a cross-shaped column (the embodiment c; FIGS. 1c, 2c, 3c, and 4c); male coupling protrusions 120 formed on a first surface of the body 110 in a height direction thereof and a surface opposite to the first surface, respectively; female coupling grooves 130 formed in a second surface of the body 110 and a surface opposite to the second surface, respectively, each of the female coupling grooves 130 having a shape corresponding to the shape of each of the male coupling protrusions 120; a habitat part 140 configured as space defined at a center portion of the body 110 (the embodiment a and the embodiment b) or at a portion of the body 110 in the height direction thereof (the embodiment c) so as to allow seawater to pass therethrough and remain therein such that the habitat part has a fish and shellfish habitat function and a wave-dissipating function; an auxiliary habitat part 141 (the embodiment c) configured as space defined at the upper and lower surfaces of the body 110 so as to allow seawater to pass therethrough and remain therein such that the auxiliary habitat part has the fish and shellfish habitat function and wave-dissipating function; a cross-shaped vertical dividing plate 180 (the embodiment a) or a middle dividing plate 181 (the embodiment b) provided as a plate dividing the habitat part 140 into habitat parts, the cross-shaped vertical dividing plate or the middle dividing plate supplying structural stability and a habitat environment of fish and shellfish to the body; a through hole 190 formed in the cross-shaped vertical dividing plate 180 (the embodiment a) or in the middle dividing plate 181 (the embodiment b) by connecting the habitat parts 140 to each other such that the habitat parts communicate with each other such that fish and shellfish move and seawater flows therethrough; and a space part 150 configured as space defined by the multiple bodies 110 connected adjacently to each other so as to allow seawater to pass therethrough and remain therein such that the space part has the fish and shellfish habitat function and wave-dissipating function.

According to the wave-dissipating block 100 configured as described above, the multiple bodies 110 having the shape of a polygonal column, a cylinder, or an oval column (the embodiment a), the shape of a cylinder or an oval column (the embodiment b), or the shape of a cross-shaped column (the embodiment c) are configured to be connected to each other and be expanded in directions perpendicular and parallel to a seabed. Accordingly, according to the expanding direction of the multiple bodies, the multiple bodies may have the shapes of submerged breakwaters or breakwaters having the artificial fish reef function and various types.

First, the body 110 placed on a seabed and having the shape of a polygonal column, a cylinder, or an oval column (the embodiment a), the shape of a cylinder or an oval column (the embodiment b), or the shape of a cross-shaped column (the embodiment c) may have the shape of a polygonal column, a circle, or an oval when seen from the seabed, and may be made of concrete or synthetic resin. That is, the body 110 may be configured to have the shape of a polygonal column, a cylinder, or an oval column having curvature, and may disperse impact transmitted by waves. That is, impact transmitted to the body 110 having the shape of a polygonal column, a cylinder, or an oval column by waves may be dispersed by the outer surface of the body 110 having curvature. In other words, when waves hit the outer surface of the body 110 having the shape of a polygonal column, a cylinder, or an oval column and having curvature, the waves are transformed into horizontal waves, so impact caused by the waves may be attenuated.

The male coupling protrusions 120 formed on the first surface of the body 110 in the height direction thereof and on the surface opposite to the first surface, respectively, are connected integrally with the body 110 having the shape of a polygonal column, a cylinder, or an oval column (the embodiment a), the shape of a cylinder or an oval column (the embodiment b), or the shape of a cross-shaped column (the embodiment c) by extending therefrom, and may be members inserted slidably to the female coupling grooves 130 to be described later in the height direction of the body.

That is, when multiple bodies 110 having the shape of a polygonal column, a cylinder, or an oval column (the embodiment a), the shape of a cylinder or an oval column (the embodiment b), or the shape of a cross-shaped column (the embodiment c) are connected to each other and expanded in the directions perpendicular and parallel to the seabed, each of the male coupling protrusions 120 and each of the female coupling grooves 130 cooperate with each other and function to prevent the multiple bodies 110 having the shape of a polygonal column, a cylinder or an oval column (the embodiment a), the shape of a cylinder or an oval column (the embodiment b), or the shape of a cross-shaped column (the embodiment c) from being separated from each other.

That is, the male coupling protrusions 120 formed on the body 110 having the shape of a polygonal column, a cylinder, or an oval column (the embodiment a), the shape of a cylinder or an oval column (the embodiment b), or the shape of a cross-shaped column (the embodiment c) may be inserted to and fastened to the female coupling grooves 130 formed in another body 110 having the shape of a polygonal column, a cylinder, or an oval column (the embodiment a), the shape of a cylinder or an oval column (the embodiment b), or the shape of a cross-shaped column (the embodiment c). In this manner, multiple bodies 110 having the shape of a polygonal column, a cylinder, or an oval column (the embodiment a), the shape of a cylinder or an oval column (the embodiment b), or the shape of a cross-shaped column (the embodiment c) may be expanded in the directions perpendicular and parallel to a seabed.

Each of the female coupling grooves 130 formed in the second surface of the body 110 having the shape of a polygonal column, a cylinder, or an oval column (the embodiment a; FIGS. 1a, 2a, 3a, and 4a), the shape of a cylinder or an oval column (the embodiment b; FIGS. 1b, 2b, 3b, and 4b), or the shape of a cross-shaped column (the embodiment c; FIGS. 1c, 2c, 3c, and 4c) and in a surface opposite to the second surface, respectively, may have the shape corresponding to the shape of the male coupling protrusion 120 as described above.

For reference, the male coupling protrusion 120 preferably has holding jaws formed at opposite sides of the front end thereof by protruding therefrom such that the male coupling protrusion 120 is not removed from the female coupling groove 130 when the male coupling protrusion 120 is inserted to the female coupling groove 130. In response to this, the female coupling groove 130 may be configured to have a shape corresponding to the shape of the male coupling protrusion 120 on which the holding jaws are formed.

In addition, in the case of a basic type of the wave-dissipating block, one male coupling protrusion 120 or one female coupling groove 130 is formed on each surface of the body 110. However, in consideration of coupling force and structural stability between the bodies and in consideration of coupling force and structural stability between the wave-dissipating blocks expanded in the directions perpendicular and parallel to a seabed, at least two male coupling protrusions 120 or at least two female coupling grooves 130 may be formed on each surface of the body.

That is, in the case of the basic type, the male coupling protrusions 120 are formed on the first surface of the body in the height direction thereof and on a surface opposite to the first surface, respectively, so two male coupling protrusions 120 are formed on each body. However, in consideration of the coupling force and structural stability between each body, two to ten male coupling protrusions 120 may be formed on each body.

Likewise, the number of the female coupling grooves 130 is required to correspond to the number of the male coupling protrusions 120. In the case of the basic type, the female coupling grooves 130 are formed in the second surface of the body and in the surface opposite to the second surface, respectively, so two female coupling grooves 130 are formed in each body. However, in consideration of the coupling force and structural stability, two to ten female coupling grooves 130 may be formed in each body.

As illustrated in FIGS. 2a, 2b, and 2c, the habitat part 140 configured as space defined at the center portion of the body to allow seawater to pass therethrough and remain therein such that the habitat part 140 has a fish and shellfish habitat function and a wave-dissipating function may be provided at the center portion of the body 110 having the shape of a polygonal column, a cylinder, or an oval column (the embodiment a), or the shape of a cylinder or an oval column (the embodiment b), or may be provided at a portion of the body 110 in the height direction thereof (the embodiment c).

Such a habitat part 140 provides space allowing seawater to pass therethrough and remain therein such that the habitat part has the fish and shellfish habitat function and the wave-dissipating function. The habitat part 140 is connected to the space part 150 to be described later such that the habitat part 140 communicates with the space part 150 so as to allow seawater to pass therethrough and remain therein, whereby spaces of the habitat part 140 and space part 150 having the fish and shellfish habitat function and the wave-dissipating function may be configured to communicate with each other.

Meanwhile, the habitat part 140 is provided as a plate, and is divided into four parts (the embodiment a) by the cross-shaped vertical dividing plate 180, or is divided into two parts (the embodiment b) by the middle dividing plate such that the cross-shaped vertical dividing plate 180 or the middle dividing plate supplies structural stability and a fish and shellfish habitat environment to the body, wherein the four parts (the embodiment a) or the two parts (the embodiment b) into which the habitat part is divided may be connected to each other to communicate with each other through the through hole formed in the cross-shaped vertical dividing plate (the embodiment a) or in the middle dividing plate (the embodiment b) such that fish and shellfish move and seawater flows therethrough. Accordingly, fish and shellfish may go in and out of the four parts (the embodiment a) and two parts (the embodiment b) into which the habitat part is divided at the center portion of the body 110 through the through hole, and seawater may flow through the four parts or two parts.

In addition, the space part 150 is configured by having space defined by the multiple bodies 110 connected adjacently to each other so as to allow seawater to pass therethrough and remain therein such that the space part has a fish and shellfish habitat function and a wave-dissipating function. Such a space part 150 is the largest space performing the fish and shellfish habitat function and the wave-dissipating function.

Furthermore, a groove part 160 is formed at the circumferential part of the upper or lower surface of the body; a groove part 160 is formed even in the male coupling protrusion 120; and a groove part 160 is formed even in the female coupling groove 130, whereby the habitat parts 140 of the wave-dissipating blocks adjacent to each other and the space parts 150 defined between the multiple wave-dissipating blocks connected adjacently to each other communicate with each other such that fish and shellfish move and seawater flows therethrough.

Groove parts are formed at the circumferential parts of the upper and lower surfaces of the body in which the male coupling protrusion 120 and the female coupling groove 130 are not formed, so in two wave-dissipating blocks expanded in the height direction of the body, a lower groove part 160 of an upper wave-dissipating block and an upper groove part 160 of a lower wave-dissipating block may cooperate with each other to form one hole part.

In the multiple groove parts 160, a groove part 160 formed in the male coupling protrusion 120 may be formed by connecting end parts of the male coupling protrusion 120 to each other provided at the opposite sides of the male coupling protrusion 120, respectively, in the height direction of the body.

In addition, in the multiple groove parts 160, a groove part 160 formed in the female coupling groove 130 may be connected to a female coupling groove 130 formed in each of the bodies 110 to communicate therewith.

Meanwhile, multiple insertion protrusions 170 may be formed on the outer surface of the body 110 and on the habitat part.

The insertion protrusions 170 may be formed on the outer surface of the body 110 along a vertical direction thereof, and may provide space for seaweed to be inserted thereto to live, and further, may function as a spawning ground for fish.

Meanwhile, an insertion groove 171 is formed between the multiple insertion protrusions 170, and is configured to have a shape tapered from the outer surface of the body 110 toward the inner part thereof. Accordingly, the insertion groove provides niche space which shellfish is introduced thereto to inhabit. Accordingly, fish and shellfish or algae may inhabit the niche space, and eggs of fish may also develop therein.

Hereinbelow, a process in which the wave-dissipating block 100 according to the embodiments of the present disclosure is expanded in the directions perpendicular and parallel to a seabed will be described with reference to FIGS. 3a, 3b, and 3c and FIGS. 4a, 4b, and 4c.

As illustrated in FIGS. 3a, 3b, and 3c, four wave-dissipating blocks 100 may be connected to each other and may be expanded in the direction parallel to a seabed. For reference, in FIGS. 3a, 3b, and 3c, the four wave-dissipating blocks 100 are illustrated to be expanded in the direction parallel to the seabed by being connected to each other, but the wave-dissipating block of the present disclosure is not limited thereto. Multiple wave-dissipating blocks 100 may be endlessly expanded in the directions perpendicular and parallel to the seabed by being connected to each other.

As illustrated in FIGS. 3a, 3b, and 3c, the male coupling protrusion 120 formed on one body of the multiple bodies 110 is vertically inserted slidably to the female coupling groove 130 of a body 110 arranged adjacently thereto. Accordingly, the multiple bodies 110 can maintain combined state thereof without being separated from each other.

In this case, in the multiple bodies 110 expanded in the directions perpendicular and parallel to the seabed, the bodies 110 arranged adjacently to each other may have heights different from each other.

As illustrated in FIGS. 4a, 4b, and 4c, this is to provide extra space such that when the multiple bodies 110 arranged at a lower side are expanded in the horizontal and vertical directions of the body (in the direction parallel to a seabed) and then other bodies 110 are laminated thereon to have multiple layers, the female coupling grooves 130 or the male coupling protrusions 120 of the bodies 110 arranged at the lower side are inserted to the male coupling protrusions 120 or the female coupling grooves 130 of the bodies 110 to be laminated thereon, respectively.

If the multiple bodies 110 arranged at the lower side by being expanded in the horizontal and vertical directions of the body (in the direction parallel to a seabed) have the same heights, the other multiple bodies 110 arranged thereon are just placed on the multiple bodies 110 arranged at the lower side, and any connection therebetween is not performed. Accordingly, the multiple bodies 110 arranged at the upper side are removed from the upper sides of the multiple bodies 110 arranged at the lower side by an external force.

Accordingly, in a process in which the multiple bodies 110 are expanded in the height direction of the body, to prevent the bodies 110 laminated to have multiple layers from moving in the horizontal and vertical directions of the body (in the direction parallel to a seabed), the bodies 110 having heights different from each other may be coupled to each other by the male coupling protrusions 120 and the female coupling grooves 130.

In this case, in consideration of coupling force and supporting force between the bodies 110 adjacent to each other, when height of a basic wave-dissipating block is 1, a wave-dissipating block adjacent thereto is configured to have height of 0.5, 1.5, 2, 2.5, 3, 3.5, or 4 which is a multiple of 0.5 except for 1, and preferably, may be configured to have height of one of 0.5, 1.5, 2, 2.5, and 3, and more preferably, may be configured to have height of one of 0.5, 1.5, and 2, and the most preferably, may be configured to have height of one of 0.5 and 1.5.

Meanwhile, as illustrated in FIGS. 4a, 4b, and 4c, in the wave-dissipating blocks 100 expanded in the direction perpendicular and parallel to a seabed, as described above, the habitat parts 140 of the bodies adjacent to each other communicate with each other through the multiple groove parts 160, and the space parts 150 defined between the multiple bodies connected adjacently to each other also communicate with each other such that fish and shellfish move and seawater flows therethrough, so an environment suitable for fish and shellfish to inhabit may be created to form fisheries rich in food for the fish and shellfish on the seabed.

Meanwhile, seawater may be introduced to the habitat part 140 and the space part 150 through the groove part 160 of the body 110 arranged at a lower part thereof and the groove part 160 of the body 110 arranged at an upper part thereof, so an upwelling phenomenon may occur in the habitat part 140 and the space part 150.

That is, the habitat parts 140 and the space parts 150 provided in the multiple bodies 110 and between the multiple bodies 110, respectively, expanded in the direction perpendicular to a seabed are connected to each other such that the habitat parts 140 and the space parts 150 communicate with each other, whereby seawater may flow to the habitat parts 140 and the space parts 150 through the multiple groove parts 160 formed in each of the bodies 110. Accordingly, upwelling phenomena may occur in the habitat parts 140 and the space parts 150 due to the seawater flowing in all directions through the multiple groove parts 160.

Accordingly, due to the occurrence of the upwelling phenomena in the habitat parts 140 and the space parts 150, vortices may also occur in the bodies 110 laminated to have multiple layers. Due to the vortices, oxygen may be efficiently supplied to fish and shellfish, and further, an optimal environment which fish and shellfish inhabit may be created by self-purification of seawater due to the vortices.

In addition, the force of waves moving toward the submerged breakwater and the breakwater may be reduced by the upwelling phenomena occurring in the multiple bodies 110 laminated to have multiple layers in the direction perpendicular to a seabed, so wave overtopping may be prevented.

Although the specific embodiments according to the present disclosure have been described so far, various modifications are possible without departing from the scope of the present disclosure.

For example, in the embodiments of the present disclosure, the multiple bodies 110 are described and illustrated in the drawings as being laminated to have two layers, but are not limited thereto and may be laminated to have at least three layers.

In addition, the multiple groove parts 160 formed in the upper or lower surface of the body 110 may be formed in the body 110 to have various shapes or depths. For example, each of the multiple groove parts 160 may have a hemispherical shape or a U shape, and the depth of the groove part may also be adjusted appropriately in response to the environment of a seabed at which the wave-dissipating block 100 is installed.

Therefore, the scope of the present disclosure should not be defined by being limited to the embodiments described above, but should be defined not only by the scope of the claims to be described later, but also by equivalents to the scope of the claims.

The invention claimed is:

1. A plurality of wave-dissipating blocks, each wave-dissipating block comprising:
   a body placed on a seabed and having a shape of a polygonal column, a cylinder, or an oval column;
   male coupling protrusions formed on a first surface of the body in a height direction thereof and on a surface opposite to the first surface, respectively;
   female coupling grooves formed in a second surface of the body in the height direction thereof and in a surface opposite to the second surface, respectively, each of the female coupling grooves having a shape corresponding to a shape of each of the male coupling protrusions;
   a habitat part configured as a habitat space defined at a center portion of the body to allow seawater to pass therethrough or remain therein such that the habitat part includes a fish and shellfish habitat and dissipates waves;
   a cross-shaped vertical dividing plate to divide the habitat part into habitat parts, wherein the cross-shaped vertical dividing plate supplies structural stability to the body;
   a through hole formed in the cross-shaped vertical dividing plate by connecting the habitat parts to each other such that the habitat parts communicate with each other such that fish and shellfish move and the seawater flows therethrough; and
   a space part having a space defined between multiple bodies of the plurality of wave-dissipating blocks arranged adjacently to each other to allow the seawater to pass therethrough and remain therein such that the space part includes the fish and shellfish habitat and dissipates waves,
   wherein multiple insertion protrusions are formed on an outer surface of the body or on an inner surface of the body in which the habitat part is divided, and an insertion groove is formed between the multiple insertion protrusions, and
   wherein the male coupling protrusions are inserted into the female coupling grooves respectively such that the plurality of wave-dissipating blocks are expanded in directions parallel and perpendicular to the seabed.

2. The plurality of wave-dissipating blocks of claim 1, wherein in each wave-dissipating block, the male coupling protrusions are respectively inserted to and removed from the female coupling grooves in the height direction of the body.

3. The plurality of wave-dissipating blocks of claim 2, wherein the wave-dissipating blocks arranged adjacently to each other have heights different from each other, and a ratio of the heights is selected to be one of 1:0.5, 1:1.5, 1:2, 1:2.5, or 1:3.

4. The plurality of wave-dissipating blocks of claim 3, wherein a male groove is formed in each of the male coupling protrusions, and a female groove is formed in each of the female coupling grooves, and a body groove is formed in the body between the male coupling protrusions and the female coupling grooves, so the habitat parts of the bodies adjacent to each other communicate with each other and the space part having the space defined between the multiple bodies arranged adjacently to each other also communicate with each other such that the fish and shellfish move and the seawater flows therethrough.

5. The plurality of wave-dissipating blocks of claim 1, wherein the insertion groove is configured to have a shape tapered from the outer surface of the body toward the inner surface thereof to define a niche space into which the fish and shellfish are introduced to inhabit the habitat.

6. A plurality of wave-dissipating blocks, each wave-dissipating block comprising:
   a body placed on a seabed and having a shape of a cylinder or an oval column;
   male coupling protrusions formed on a first surface of the body in a height direction thereof and on a surface opposite to the first surface, respectively;
   female coupling grooves formed in a second surface of the body in the height direction thereof and in a surface opposite to the second surface, respectively, each of the female coupling grooves having a shape corresponding to a shape of each of the male coupling protrusions;
   a habitat part configured as a habitat space defined at a center portion of the body to allow seawater to pass therethrough or remain therein such that the habitat part includes a fish and shellfish habitat and dissipates waves;
   a middle dividing plate to divide the habitat part into an upper habitat part and a lower habitat part, wherein the middle dividing plate supplies structural stability to the body; and
   a through hole formed in the middle dividing plate by connecting the upper habitat part and the lower habitat part to each other such that the upper habitat part and the lower habitat part communicate with each other such that fish and shellfish move and the seawater flows therethrough; and
   a space part having a space defined between multiple bodies of the plurality of wave-dissipating blocks arranged adjacently to each other to allow the seawater to pass therethrough and remain therein such that the space part includes the fish and shellfish habitat and dissipates waves,
   wherein multiple insertion protrusions are formed on an outer surface of the body or on an inner surface of the body in which the habitat part is divided, and an insertion groove is formed between the multiple insertion protrusions, and
   wherein the male coupling protrusions are inserted into the female coupling grooves respectively such that the plurality of wave-dissipating blocks are expanded in directions parallel and perpendicular to the seabed.

7. The plurality of wave-dissipating blocks of claim 6, wherein in each wave-dissipating block, the male coupling protrusions are respectively inserted to and removed from the female coupling grooves in the height direction of the body.

8. The plurality of wave-dissipating blocks of claim 7, wherein the wave-dissipating blocks arranged adjacently to each other have heights different from each other, and a ratio of the heights is selected to be one of 1:0.5, 1:1.5, 1:2, 1:2.5, or 1:3.

9. The plurality of wave-dissipating blocks of claim 8, wherein a male groove is formed in each of the male coupling protrusions, and a female groove is formed in each of the female coupling grooves, and a body groove is formed in the body between the male coupling protrusions and the female coupling grooves, so the habitat parts of the bodies adjacent to each other communicate with each other, and the space part having the space defined between the multiple bodies arranged adjacently to each other also communicate with each other such that the fish and shellfish move and the seawater flows therethrough.

10. The plurality of wave-dissipating blocks of claim 6, wherein the insertion groove is configured to have a shape tapered from the outer surface of the body toward the inner surface thereof to define a niche space into which the fish and shellfish are introduced to inhabit the habitat.

11. A plurality of wave-dissipating blocks, each wave-dissipating block comprising:
- a body placed on a seabed and having a shape of a cross-shaped column;
- male coupling protrusions formed on a first surface of the body in a height direction thereof and on a surface opposite to the first surface, respectively;
- female coupling grooves formed in a second surface of the body in the height direction thereof and in a surface opposite to the second surface, respectively, each of the female coupling grooves having a shape corresponding to a shape of each of the male coupling protrusions;
- a habitat part configured as a habitat space defined at a portion of the body in the height direction thereof to allow seawater to pass therethrough and remain therein such that the habitat part includes a fish and shellfish habitat and a dissipates waves;
- a space part is defined between multiple bodies having cross-shaped column shapes of the plurality of wave-dissipating blocks arranged adjacently to each other so as to allow the seawater to pass therethrough and remain therein such that the space part includes the fish and shellfish habitat and dissipates waves; and
- a male groove formed in each male coupling protrusion;
- a female groove formed in each female coupling groove; and
- a body groove formed in the body between the male coupling protrusions and the female coupling grooves, so the habitat parts of the bodies adjacent to each other communicate with each other and the space part having the space defined between the multiple bodies arranged adjacently to each other also communicate with each other such that fish and shellfish move and the seawater flows therethrough, wherein multiple insertion protrusions are formed on an outer surface of the body, and an insertion groove is formed between the multiple insertion protrusions, and wherein the male coupling protrusions are inserted into the female coupling grooves respectively such that the plurality of wave-dissipating blocks are expanded in directions parallel and perpendicular to the seabed.

12. The plurality of wave-dissipating blocks of claim 11, wherein in each wave-dissipating block, the male coupling protrusions are respectively inserted to and removed from the female coupling grooves only in the height direction of the body.

13. The plurality of wave-dissipating blocks of claim 12, wherein the wave-dissipating blocks arranged adjacently to each other have heights different from each other, and a ratio of the heights is selected to be one of 1:0.5, 1:1.5, 1:2, 1:2.5, or 1:3.

14. The plurality of wave-dissipating blocks of claim 13, further comprising:
- an auxiliary habitat part configured as a space defined at upper and lower surfaces of the body having the shape of a cross-shaped column to allow the seawater to pass therethrough and remain therein such that the auxiliary habitat part includes the fish and shellfish habitat and dissipates waves.

15. The plurality of wave-dissipating blocks of claim 14, wherein a combination of the habitat part and the auxiliary habitat part constitutes 20% to 60% of the body.

16. The plurality of wave-dissipating blocks of claim 11, wherein the insertion groove is configured to have a shape tapered from the outer surface of the body toward the inner surface thereof to define a niche space into which the fish and shellfish are introduced to inhabit the habitat.

* * * * *